United States Patent [19]
Bailey et al.

[11] Patent Number: 5,235,863
[45] Date of Patent: Aug. 17, 1993

[54] SOIL-GAS SAMPLING APPARATUS

[75] Inventors: Christian E. Bailey, Port Deposit, Md.; Mark B. Stutman, Lewisville, Pa.

[73] Assignee: W. L. Gore & Associates, Inc., Newark, Del.

[21] Appl. No.: 891,667

[22] Filed: May 29, 1992

Related U.S. Application Data

[63] Continuation of Ser. No. 709,682, Jun. 3, 1991, abandoned, which is a continuation-in-part of Ser. No. 579,440, Sep. 7, 1990, abandoned.

[51] Int. Cl.$^5$ .............................................. G01N 1/22
[52] U.S. Cl. ............................. 73/863.23; 73/863.21; 73/864.74
[58] Field of Search ........... 73/863.21, 863.23, 864.51, 73/864.72–864.74; 422/88; 436/25, 28, 29

[56] References Cited

U.S. PATENT DOCUMENTS

| | | |
|---|---|---|
| 2,345,219 | 3/1944 | Sanderson . |
| 3,028,313 | 4/1962 | Oberdorfer, Jr. et al. . |
| 4,065,972 | 1/1978 | Holub et al. . |
| 4,208,912 | 6/1980 | Baldeck . |
| 4,790,857 | 12/1988 | Miksch . |
| 4,830,643 | 5/1989 | Sassa et al. . |

FOREIGN PATENT DOCUMENTS

| | | |
|---|---|---|
| 373990 | 12/1921 | Fed. Rep. of Germany . |
| 2299651 | 8/1976 | France . |

OTHER PUBLICATIONS

Patent Abstracts of Japan, vol. 008, No. 275, publication No. 59141036.
Abstract-SU 1267-443-A, Dec. 1984.

*Primary Examiner*—Robert Raevis
*Attorney, Agent, or Firm*—Gary A. Samuels

[57] ABSTRACT

Apparatus for soil-gas sampling comprising one or more passive vapor collectors enclosed within a liquid water penetration resistant vapor-permeable container to which means for easy in-ground insertion and retrieval is attached. The apparatus provides protection from water, dirt and mechanical damage to the vapor collector(s) during the insertion, sampling and removal steps and permits retrieval of the container from its in-ground location without the efforts and risks associated with excavation.

7 Claims, 1 Drawing Sheet

SOIL-GAS SAMPLING APPARATUS

CROSS-REFERENCE TO RELATED APPLICATIONS

This application is a continuation-in-part of application Ser. No. 07/709,682 filed Jun. 3, 1991, now abandoned, which is a continuation-in-part of application Ser. No. 07/579,440, now abandoned.

FIELD OF THE INVENTION

This invention relates to apparatus for in-ground collection by passive vapor collectors of subsurface gases for subsequent analysis; and more particularly, to apparatus which include protection of the collectors from water, dirt, and mechanical damage during the in-ground insertion, sampling and removal steps. The apparatus simplifies and makes easier in-ground insertion and retrieval of the collectors.

BACKGROUND OF THE INVENTION

The use of in-ground vapor collectors to obtain samples of subsurface gases is well known. For example, they can be used in geological explorations for oil, natural gas and geothermal resources. Another example is in the collection of gases emanating from pollutants in the ground from such sources as chemical wastes, accidental spills, tank or piping leaks and the like.

These soil gases are often present in very low concentrations or in soil conditions that make it difficult to obtain a reliable results using active gas collection techniques. Passive vapor collectors accumulate gases over extended periods of time and can be left in place until sufficient sample is sorbed by them so that reliable measurements of the gases can be made.

Active collection methods are distinguished from passive collection methods by the means by which the sampled gases are conveyed to collectors or to analytical instruments. In active collection methods soil-gas samples re drawn from the in-ground sampling location and transferred by pumping them through pipes or tubing connected to collectors or analytical instruments which are usually above-ground. The samples of this method are transferred at relatively high rates over relatively short sampling periods. In passive collection methods the collectors are sited directly at in-ground sampling locations without connection to external equipment. Samples are accumulated in situ at much lower rates and over relatively long periods of time by diffusion of soil-gases into the passive collectors.

It can be seen from the application listed above that the collectors may be placed in locations and environments that vary extremely in their topography, weather, soil types and soil conditions. These variations must be faced as a matter of fact and problems associated with them overcome. Of particular concern are those variations which influence the performance of the sorbents and those which influence in-ground insertion and retrieval of the collectors.

In order for passive vapor collectors to function effectively their sorbents must be kept clean and free of contaminating materials. In many locations the presence of water will adversely affect the performance of the sorbents; either by occupying sorbent sites itself when it contacts the sorbent or by exposing the sorbent to water-borne contaminants which then occupy the sorbent sites.

The in-ground insertion and retrieval of passive vapor collectors also expose them to risks that may adversely affect their performance. There is a risk of physical damage to the passive vapor collectors during the insertion and retrieval steps, in particularly, during the excavation step necessary to recover the collector for further work. There is also a risk of sorbent contamination during the insertion and retrieval steps. This risk is associated with exposure of the collector to the surface atmosphere during the time required to carefully emplace the collector and the much more lengthy time required for careful excavation and recovery of the collector.

There is another risk of sorbent contamination which must be considered. This risk is associated with the size and depth of the hole required for emplacement of the collector. The collector should be located at a depth that prevents influence by the surface atmosphere in a hole created with minimum ground disturbance. The wider and shallower a hole is, the more difficult it becomes to reliably seal it against surface influence.

It can be seen then that a system that provides protection from contamination and physical damage to the collectors, minimizes ground disturbance, facilitates in-ground insertion and retrieval, and eliminates the need for excavation to recover the collectors would be very desirable.

SUMMARY OF THE INVENTION

This invention provides improvements in in-ground sampling equipment for collection of volatile gases in subsurface soils.

It also provides novel apparatus which safeguard the sensitivity and collection capability of passive vapor collectors by protecting them from damage or contamination caused by water instruction and substances carried by water.

It also provides novel apparatus for easy in-ground insertion and retrieval of passive vapor collectors which minimize ground disturbance and exposure time to the surface atmosphere during insertion and retrieval; and which also facilitates effective sealing of the hole to reduce risk of contamination by the surface atmosphere during the in-ground residence period.

Specifically, the apparatus of the invention comprises (a) at least one passive vapor collector and (b) a means for protecting and retrieving said collector from in-ground locations comprising at least one liquid water penetration resistant vapor-permeable container which enclosures the the passive vapor collector (a).

By "vapor-permeable" is meant that the container walls permit diffusion of soil-gas vapors from the soil, inward, to the collector. Liquid water penetration resistance is used herein to mean the resistance to passage of liquid water from one side of a porous material to the other side.

DETAILED DESCRIPTION OF THE INVENTION

Figure 4:
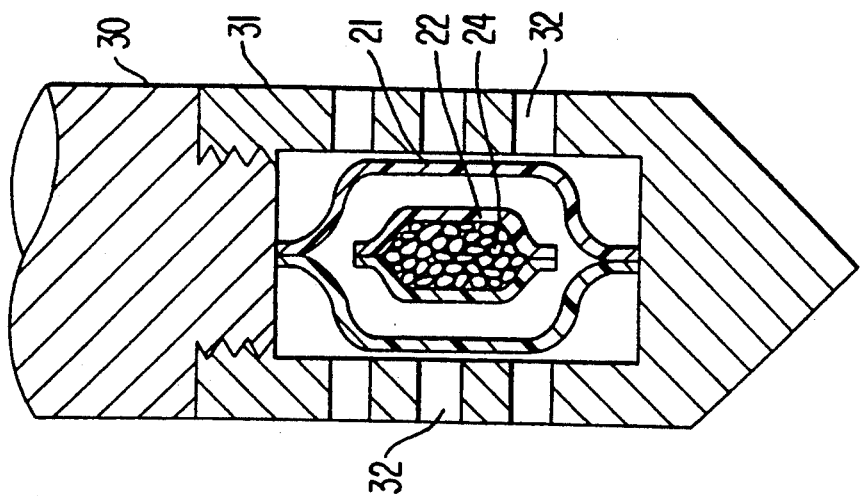
FIG. 4 is a cross-sectional view of another embodiment of the invention illustrating its appearance when the means for in-ground insertion and retrieval is a rigid member.

Assembly and use of the invention can best be understood by referring to the drawings.

Figure 1:
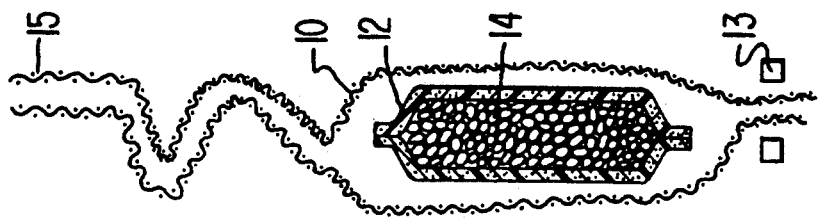
FIG. 1 is a cross-section view of one embodiment of the invention as it appears after in-ground insertion.

The embodiment of the invention shown in FIG. 1 is constructed by first placing a passive vapor collector 12 containing sorbent 14 in a flexible tubular liquid water penetration resistant vapor-permeable means for insertion and retrieval 10. One end of the tube is closed with a clamp 13 or by knotting, crimping or heat sealing to form a container enclosing the vapor collector 12. If desired, a weight may be placed inside with the vapor collector or attached externally to the tube to facilitate insertion into the ground. The other end of the means for insertion and retrieval 10 is extended for use in retrieving the apparatus from in-ground locations. The flexible means for insertion and retrieval 10 is preferably a flexible tube of porous expanded polytetrafluoroethylene.

The completed assembly is packaged and taken to the field where the flexible means for insertion and retrieval 10 is unfolded and used to lower the passive vapor monitor 12 in to a previously prepared hole in the ground. The hole, typically about 0.5 inches in diameter by about 3 feet deep is usually created by tile probe or auger. The hole is backfilled quickly with the collector in place and a length 15 of the extended end of the tube 10 left on the surface to serve as a location marker and for withdrawal of the passive vapor collector from the ground.

To recover the collector from its in-ground location the end of the tube on the surface is grasped and used to pull the collector to the surface. As the forces of lifting the collector are applied the flexible tube 10 stretches and distorts itself so as to tightly conform to and uniformly apply constrictive forces to the collector while, at the same time, forming a taper shape in the direction of lift immediately above the collector thereby aiding in recovering the apparatus without damage and without the need for excavation.

Porous expanded polytetrafluoroethylene tube 10 provides a liquid water penetration resistant vapor-permeable protective container which prevents damage from soiling, mechanical abrasion, water and water-borne contaminants to the sorbent materials of the collector. In addition, the smooth slippery surface of the expanded polytetrafluoroethylene tube combined with its ability to streamline itself when pulled on, significantly simplifies removal of the passive vapor collector from in-ground locations and eliminates the costs and problems associated with excavation to retrieve the collector.

Although passive vapor collectors such as the Pro-Tek ® Organic Vapor Badge, 3M Organic Vapor Monitor, Vapor-Trak ® Toxic Gas Monitor and the like may be used, the passive vapor collector 12 is preferably a porous polytetrafluoroethylene tubular container containing a sorbent 14 (shown as solid particulate) as described in U.S. Pat. No. 4,830,643. The porous polytetrafluoroethylene sorbent container provides advantages over other passive vapor collector constructions in that secondary protection against water intrusion, abrasion and soiling is provided by the collector itself.

A further advantage of the construction described thus far is that it permits easy cleaning of the entire assembly or regeneration of the sorbent, with solvents or by thermal means, prior to packaging for transport to the field. In addition, the strength, chemical inertness, and thermal properties of the porous expanded polytetrafluoroethylene also permit desorption of the sorbent without removal of the sorbent from the tubular container, for example, by solvent extraction or thermal means, which simplifies and lowers the costs of sample preparation for analysis of collected vapors.

The sorbent 14 of the passive vapor collector 12 is a material such as silica gel, activated carbon, activated charcoal, calcium carbonate, calcium sulfate, activated alumina, molecular sieve, diatomaceous earth, chromatographic polymer resin or the like. The properties of the porous expanded polytetrafluoroethylene of the passive vapor collector 12 also permit the sorbent of the collector to be a liquid or a combination of liquid and solid. The collector may be filled with a composite of sorbent grains dispersed in a matrix, for example, a composite of carbon grains in a polytetrafluoroethylene matrix. Alternatively, the collector may be filled with a material which is not a sorbent but, instead, is a material used to detect vapors by other means, for example, by color change or other chemical reaction.

Figure 2:
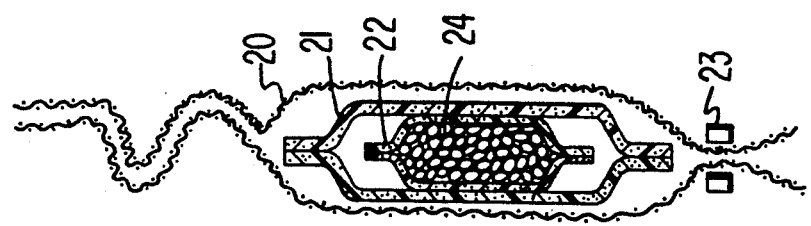
FIG. 2 is a cross-sectional view of another embodiment of the invention as it appears after in-ground insertion.

For use in applications where the passive vapor collector has little or no protection from damage by water, abrasion, or soiling inherent in its construction or where there is high potential for damage to the collector, for example, in abrasive or rocky soils, another embodiment of the invention is used as shown in FIG. 2.

Referring to FIG. 2 the apparatus of the invention is constructed by first enclosing a passive vapor collector 22 containing sorbent 24 in a liquid water penetration resistant vapor-permeable container 21 which is then fixed to a flexible porous means 20 for insertion and retrieval such as porous expanded polytetrafluoroethylene tubing, stainless steel wire mesh tubing, tubular netting, string or wire.

The protective container 21 enclosing the passive vapor collector 22 is preferably made from porous expanded polytetrafluoroethylene tubing or sheet. After enclosing the passive vapor collector the ends of the porous expanded polytetrafluoroethylene tubing or edges of the porous expanded polytetrafluoroethylene sheet are sealed by heat, mechanical pressure, suitable adhesives, plugs, clamps, or combinations of the above known in the art to form a liquid water penetration resistant vapor-permeable container.

There is some latitude possible in the selection of water penetration resistance properties of the container depending on the conditions to which it will be exposed in use. It is quite apparent that use conditions in dry desert terrain will be much different than those encountered in marshy regions or shore areas near streams, rivers, lakes and oceans. For example, for use in marshy regions, a container with higher water penetration resistance than required for use in dry desert regions is needed. Or, for example, where lower water penetration resistance is acceptable but greater strength, toughness, and abrasion resistance is needed a relatively weak, liquid water penetration resistant vapor-permeable material laminated to stronger, tougher, more abrasion resistant material can be used.

The flexible porous means for insertion and retrieval 20 for this embodiment is preferably a porous flexible expanded polytetrafluoroethylene tube. The protective container 21 enclosing the passive vapor collector 22 is inserted into the tube 20 and fixed in place by clamp 23 or by knotting, crimping, or heat-sealing the tube behind it. An alternatively preferred flexible porous means for insertion and retrieval may instead be a stainless steel wire mesh tube braided, woven or knitted of fine stainless steel wire. Such tubes have high strength and abrasion resistance without undue loss of flexibility and vapor-permeability and facilitate retrieval of the container 21 from its in-ground location even though the pull required might be great or the abrasive quality of rocky or sandy soils might be severe.

The completed assembly is inserted into the ground as described earlier. Following a predetermined residence period the apparatus is recovered by pulling it from the ground using the flexible porous means for in-ground insertion and retrieval 20 and removed from the field for further work.

Figure 3:
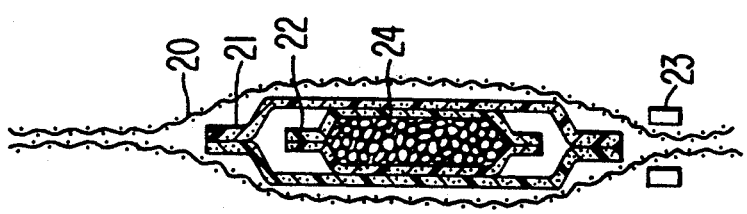
FIG. 3 is a cross-sectional view of the embodiment shown in FIG. 2 as it appears during withdrawal from the ground.

FIG. 3 shows the same elements depicted in FIG. 2 as the apparatus is being pulled from its in-ground location. As the forces required to pull the assembly through the ground are applied, the porous flexible means 20 stretches, conforms tightly to the container 21 and uniformly applies constrictive forces around the container that prevent harmful local stresses from building up and keeps the container aligned in the direction of travel. At the same time the element 20 forms a tapered shape ahead of the container, thereby, in sum, making it easy to recover the apparatus without damage and without the need for excavation.

Alternatively, for soft soils or soils with a tendency to cave in before a hole can be used, a rigid means for insertion and retrieval is desirable. Such a means is depicted in FIG. 4. A passive vapor collector 22 and protective container 21 prepared as described above are placed into a rigid metal or plastic container 31, having vents 32, which is mechanically connected to a rigid upper member 30. This embodiment is used to complete a partially developed hole or, in soft soils, can be used to simultaneously develop a hole and emplace a vapor collector. A sufficient length of the upper member is left above the surface as a location marker and to be grasped to pull the apparatus from the ground.

We claim:

1. Apparatus for soil-gas sampling, comprising:
   (a) at least one passive vapor collector comprising an assembly which contains sorbent materials, and
   (b) a means for protecting, inserting and retrieving said vapor collector from in-ground locations comprising at least one liquid water penetration resistant vapor-permeable porous flexible expanded polytetrafluoroethylene containers which encloses the passive vapor collector (a).

2. The apparatus for soil-gas sampling as recited in claim 1, wherein the means for protecting, inserting and retrieving (b) is a porous flexible expanded polytetrafluoroethylene tube which encloses the passive vapor collector (a).

3. The apparatus for soil-gas sampling as recited in claim 2, wherein the passive vapor collector (a) is a porous polytetrafluoroethylene tubular container containing a sorbent.

4. Apparatus for soil-gas sampling, comprising:
   (i) at least one passive vapor collector comprising a porous polytetrafluoroethylene tubular container filled with sorbent;
   (ii) a liquid water penetration resistant vapor-permeable container comprising porous polytetrafluoroethylene which encloses the passive collector, and
   (iii) a retrieval means for easy removal of the container from in-ground locations to which means the container is adjoined.

5. The apparatus for soil-gas sampling as recited in claim 4, wherein the means for retrieval (iii) from in-ground locations is a porous polytetrafluoroethylene tube inside which the liquid water penetration resistant vapor-permeable container (ii) is fixed.

6. The apparatus for soil-gas sampling as recited in claim 4, wherein the means for retrieval (iii) from in-ground locations is a porous flexible mesh tube inside which the liquid water penetration resistant vapor-permeable container (ii) is fixed.

7. The apparatus for soil-gas sampling as recited in claim 4, wherein the means for retrieval (iii) is a rigid member with a hollow vented end inside which the liquid water penetration resistant vapor-permeable container (ii) is placed.

* * * * *